US010469891B2

(12) United States Patent
Lanier et al.

(10) Patent No.: US 10,469,891 B2

(45) **Date of Patent: *Nov. 5, 2019**

(54) PLAYING MULTIMEDIA CONTENT ON MULTIPLE DEVICES

(71) Applicant: TiVo Solutions Inc., San Carlos, CA (US)

(72) Inventors: Brian Lanier, Bryn Mawr, PA (US); James M. Barton, Alviso, CA (US)

(73) Assignee: TiVo Solutions Inc., San Jose, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 15/181,394

(22) Filed: Jun. 13, 2016

(65) Prior Publication Data

US 2016/0295268 A1 Oct. 6, 2016

Related U.S. Application Data

(63) Continuation of application No. 12/828,040, filed on Jun. 30, 2010, now Pat. No. 9,369,776, which is a (Continued)

(51) Int. Cl.

*G06F 3/048* (2013.01)

*H04N 21/41* (2011.01)

(Continued)

(52) U.S. Cl.

CPC ....... *H04N 21/4122* (2013.01); *G06F 3/1438* (2013.01); *G06Q 20/102* (2013.01);

(Continued)

(58) Field of Classification Search

CPC ...................................................... G06F 3/048

See application file for complete search history.

(56) References Cited

U.S. PATENT DOCUMENTS 4,282,606 A 8/1981 Factor 4,905,196 A 2/1990 Kirrmann (Continued)

FOREIGN PATENT DOCUMENTS

CN 1700168 11/2005

CN 1753316 3/2006

(Continued)

OTHER PUBLICATIONS

U.S. Appl. No. 12/827,984, Final Office Action dated Jun. 12, 2012.

(Continued)

*Primary Examiner* — Pei Yong Weng

(74) *Attorney, Agent, or Firm* — Haley Guiliano LLP

(57) ABSTRACT

A method for displaying multimedia content is described. The method includes causing playing of multimedia content on a first device; responsive to a first user input, on a second device, comprising one of: playing, fast forwarding, rewinding, or pausing the playing of the multimedia content: causing an action comprising one of: playing, fast forwarding, rewinding, or pausing of the multimedia content on the second device at a start position that is based on the user input and a current position of the playing of the multimedia content on the first device.

20 Claims, 11 Drawing Sheets

Remote Control
10
Touch Screen Menu
15
Pause
Play
Stop
Rewind
Fast-Forward
Video Cassette Recorder
20
Display Screen
30
Media Content
35

Related U.S. Application Data continuation of application No. 12/693,410, filed on Jan. 25, 2010, now abandoned.

(51) Int. Cl.

*G06Q 20/10* (2012.01)
*H04N 21/433* (2011.01)
*H04N 21/4402* (2011.01)
*H04N 21/81* (2011.01)
*G06F 3/14* (2006.01)
*H04L 29/06* (2006.01)
*H04N 21/2387* (2011.01)
*H04N 21/242* (2011.01)
*H04N 21/43* (2011.01)
*H04N 21/472* (2011.01)
*H04N 21/431* (2011.01)
*H04N 21/475* (2011.01)
*H04N 21/61* (2011.01)

(52) U.S. Cl.

CPC ..... *H04L 65/4076* (2013.01); *H04N 21/2387* (2013.01); *H04N 21/242* (2013.01); *H04N 21/4126* (2013.01); *H04N 21/431* (2013.01); *H04N 21/4302* (2013.01); *H04N 21/4334* (2013.01); *H04N 21/4402* (2013.01); *H04N 21/4751* (2013.01); *H04N 21/47217* (2013.01); *H04N 21/6125* (2013.01); *H04N 21/812* (2013.01); *G09G 2340/045* (2013.01)

(56) References Cited

U.S. PATENT DOCUMENTS 5,292,125 A 3/1994 Hochstein
5,393,072 A 2/1995 Best
5,692,143 A 11/1997 Johnson et al.
5,796,402 A 8/1998 Ellison-Taylor
5,841,420 A 11/1998 Kaply et al.
5,859,639 A 1/1999 Ebrahim
5,973,683 A * 10/1999 Cragun .................. H04N 7/163 348/E7.061
5,973,692 A 10/1999 Knowlton et al.
6,061,064 A 5/2000 Reichlen
6,091,395 A 7/2000 DeStefano
6,104,423 A 8/2000 Elam
6,151,020 A 11/2000 Palmer et al.
6,192,183 B1 2/2001 Taniguchi et al.
6,233,605 B1 5/2001 Watson
6,263,503 B1 7/2001 Margulis
6,388,654 B1 5/2002 Platzker et al.
6,466,203 B2 10/2002 Van Ee
6,473,102 B1 10/2002 Rodden et al.
6,496,981 B1 12/2002 Wistendahl et al.
6,654,036 B1 11/2003 Jones
6,699,127 B1 3/2004 Lobb et al.
6,765,557 B1 7/2004 Segal
6,893,347 B1 5/2005 Zilliacus et al.
6,921,336 B1 7/2005 Best
7,040,987 B2 5/2006 Walker et al.
7,127,487 B1 10/2006 Wang et al.
7,242,389 B1 7/2007 Stern
7,336,925 B2 2/2008 Zilliacus
7,445,549 B1 11/2008 Best
7,632,186 B2 12/2009 Spanton et al.
7,682,028 B2 3/2010 Maeda et al.
7,706,278 B2 4/2010 Wing et al.
7,900,228 B2 3/2011 Stark et al.
7,917,853 B2 3/2011 Trauth
7,938,727 B1 5/2011 Konkle
8,028,323 B2 9/2011 Weel
8,264,499 B1 9/2012 Landry et al.
8,271,050 B2 9/2012 Weiss
8,806,530 B1 8/2014 Izdepski et al.
9,369,776 B2 6/2016 Lanier et al.
2001/0017630 A1 8/2001 Sakashita et al.
2002/0010026 A1 1/2002 York
2002/0032696 A1 3/2002 Takiguchi et al.
2002/0049975 A1 4/2002 Thomas et al.
2002/0056136 A1 5/2002 Wistendahl et al.
2002/0061743 A1 5/2002 Hutcheson et al.
2002/0078209 A1 6/2002 Peng
2002/0111205 A1 8/2002 Beavers
2002/0112004 A1 8/2002 Reid et al.
2002/0151366 A1 10/2002 Walker et al.
2002/0165028 A1 11/2002 Miyamoto et al.
2002/0191017 A1 12/2002 Sinclair et al.
2003/0007015 A1 1/2003 Laffey et al.
2003/0067485 A1 4/2003 Wong et al.
2003/0078103 A1 4/2003 LeMay et al.
2003/0096650 A1 5/2003 Eguchi et al.
2003/0104860 A1 6/2003 Cannon et al.
2003/0131352 A1 7/2003 Dutta et al.
2003/0189551 A1 10/2003 Olsen
2003/0189599 A1 10/2003 Ben-Shachar et al.
2003/0201914 A1 10/2003 Fujiwara et al.
2003/0220971 A1 11/2003 Kressin
2003/0229900 A1 12/2003 Reisman
2004/0012506 A1 1/2004 Fujiwara et al.
2004/0023722 A1 2/2004 Vuong et al.
2004/0031058 A1 2/2004 Reisman
2004/0054728 A1 3/2004 Rust
2004/0092311 A1 5/2004 Weston et al.
2004/0125133 A1 7/2004 Pea et al.
2004/0139159 A1 7/2004 Ricciardi et al.
2004/0150627 A1 8/2004 Luman et al.
2004/0152513 A1 8/2004 Shimizu
2004/0220926 A1 11/2004 Lamkin et al.
2004/0261038 A1 12/2004 Ording et al.
2005/0024387 A1 2/2005 Ratnakar et al.
2005/0026695 A1 2/2005 Tsuchiyama et al.
2005/0038932 A1 2/2005 Himmel et al.
2005/0060343 A1 3/2005 Gottsman et al.
2005/0060665 A1 3/2005 Dart et al.
2005/0066357 A1* 3/2005 Ryal ................. H04N 21/23424 725/35
2005/0075167 A1 4/2005 Beaulieu et al.
2005/0091302 A1 4/2005 Soin et al.
2005/0097135 A1 5/2005 Epperson et al.
2005/0187020 A1 8/2005 Amaitis et al.
2005/0257153 A1 11/2005 Ben-Shachar et al.
2005/0285740 A1 12/2005 Kubach et al.
2006/0010392 A1 1/2006 Noel et al.
2006/0026636 A1 2/2006 Stark et al.
2006/0050090 A1 3/2006 Ahmed et al.
2006/0056799 A1 3/2006 Na et al.
2006/0146012 A1 4/2006 Arneson et al.
2006/0098174 A1 5/2006 Ohuchi
2006/0105825 A1 5/2006 Findlay
2006/0136581 A1 6/2006 Smith
2006/0136828 A1 6/2006 Asano
2006/0148560 A1 7/2006 Arezina et al.
2006/0150120 A1 7/2006 Dresti et al.
2006/0174313 A1* 8/2006 Ducheneaut ........... G06Q 10/10 725/135
2006/0179032 A1 8/2006 Gottsman et al.
2006/0200520 A1 9/2006 Vernon et al.
2006/0215012 A1 9/2006 De Ruyter
2006/0221858 A1 10/2006 Switzer et al.
2006/0256188 A1 11/2006 Mock et al.
2007/0018997 A1 1/2007 Edwards
2007/0022389 A1 1/2007 Ording et al.
2007/0033254 A1 2/2007 Alhusseini et al.
2007/0042767 A1 2/2007 Stepanian
2007/0047901 A1 3/2007 Ando et al.
2007/0065122 A1 3/2007 Chatterton
2007/0067729 A1 3/2007 Danielson et al.
2007/0067808 A1 3/2007 Dacosta
2007/0098357 A1 5/2007 McEnroe et al.
2007/0117617 A1 5/2007 Spanton et al.
2007/0117635 A1 5/2007 Spanton et al.
2007/0121534 A1 5/2007 James et al.
2007/0124772 A1 5/2007 Bennett et al.

(56) References Cited

U.S. PATENT DOCUMENTS

2007/0136466 A1 6/2007 Etelapera
2007/0156883 A1 7/2007 Thompson et al.
2007/0157089 A1 7/2007 Van Os et al.
2007/0180485 A1 8/2007 Dua
2007/0198184 A1 8/2007 Yoshioka et al.
2007/0203984 A2 8/2007 AlHusseini et al.
2007/0218966 A1 9/2007 Tilston et al.
2007/0250788 A1 10/2007 Rigolet
2007/0268261 A1 11/2007 Lipson
2007/0270215 A1 11/2007 Miyamoto et al.
2008/0039205 A1 2/2008 Ackley et al.
2008/0070684 A1 3/2008 Haigh-Hutchinson et al.
2008/0076498 A1 3/2008 Yoshinobu
2008/0081558 A1 4/2008 Dunko et al.
2008/0096663 A1 4/2008 Lieberman et al.
2008/0124056 A1* 5/2008 Concotelli ........... G11B 27/034 386/278
2008/0133715 A1 6/2008 Yoneda et al.
2008/0134256 A1 6/2008 DaCosta
2008/0163330 A1 7/2008 Sparrell
2008/0201751 A1 8/2008 Ahmed et al.
2008/0227393 A1 9/2008 Tang et al.
2008/0235592 A1 9/2008 Trauth
2008/0244452 A1 10/2008 Kum
2008/0259829 A1 10/2008 Rosenblatt
2008/0268947 A1 10/2008 Fyock et al.
2008/0274798 A1 11/2008 Walket et al.
2008/0282181 A1 11/2008 Ferguson et al.
2008/0294981 A1 11/2008 Balzano et al.
2008/0310814 A1 12/2008 Bowra et al.
2009/0002316 A1 1/2009 Rofougaran
2009/0044216 A1 2/2009 McNicoll
2009/0061841 A1 3/2009 Chaudhri et al.
2009/0096573 A1 4/2009 Graessley
2009/0098940 A1 4/2009 Sangberg
2009/0111378 A1 4/2009 Sheynman et al.
2009/0124363 A1 5/2009 Baerlocher et al.
2009/0144785 A1 6/2009 Walker et al.
2009/0149254 A1 6/2009 Kelly et al.
2009/0150939 A1 6/2009 Drucker
2009/0153751 A1 6/2009 Asakura et al.
2009/0158323 A1 6/2009 Bober et al.
2009/0172597 A1 7/2009 Mercer
2009/0174653 A1 7/2009 Shin et al.
2009/0177783 A1 7/2009 Adler et al.
2009/0191965 A1 7/2009 Dixon
2009/0191968 A1 7/2009 Johnson et al.
2009/0199098 A1 8/2009 Kweon et al.
2009/0201134 A1 8/2009 Rofougaran
2009/0232481 A1 9/2009 Baalbergen et al.
2009/0282396 A1 11/2009 Boyer et al.
2009/0286479 A1 11/2009 Thoresson et al.
2009/0298535 A1 12/2009 Klein et al.
2009/0300620 A1 12/2009 Park et al.
2009/0310933 A1 12/2009 Lee
2009/0313658 A1 12/2009 Nishimura et al.
2009/0322558 A1 12/2009 Videtich et al.
2009/0327894 A1 12/2009 Rakib
2010/0005137 A1 1/2010 Kalama et al.
2010/0060572 A1 3/2010 Tsern
2010/0109868 A1 5/2010 Berger
2010/0131978 A1 5/2010 Friedlander et al.
2010/0245585 A1 9/2010 Fisher et al.
2010/0251292 A1 9/2010 Srinivasan et al.
2010/0262958 A1 10/2010 Clinton et al.
2010/0278345 A1 11/2010 Alsina et al.
2010/0317432 A1 12/2010 Tanabe et al.
2011/0057008 A1 3/2011 Clausen et al.
2011/0069940 A1 3/2011 Shimy et al.
2011/0080289 A1 4/2011 Minton
2011/0181780 A1 7/2011 Lanier et al.
2011/0183654 A1 7/2011 Lanier et al.
2011/0184862 A1 7/2011 Lanier et al.
2011/0185036 A1 7/2011 Lanier et al.
2011/0185296 A1 7/2011 Lanier et al.
2011/0185312 A1 7/2011 Lanier et al.
2011/0275364 A1 11/2011 Austin et al.
2012/0128172 A1 5/2012 Alden
2016/0286274 A1 9/2016 Lanier et al.

FOREIGN PATENT DOCUMENTS

EP 1829339 A1 9/2007
TW 200943962 10/2009
WO WO2005/109829 11/2005
WO WO 2008/092233 8/2008
WO WO2011/090951 7/2011

OTHER PUBLICATIONS

U.S. Appl. No. 12/693,410, Final Office Action dated Aug. 14, 2012.
U.S. Appl. No. 12/827,992, Final Office Action dated Aug. 21, 2012.
U.S. Appl. No. 12/828,045, Final Office Action dated Aug. 29, 2012.
U.S. Appl. No. 12/828,040, Advisory Action dated Sep. 17, 2012.
U.S. Appl. No. 12/828,024, Final Office Action dated Nov. 21, 2012.
U.S. Appl. No. 12/828,040, Non-Final Office Action dated Dec. 6, 2012.
U.S. Appl. No. 12/872,829, Non-Final Office Action dated Dec. 12, 2012.
U.S. Appl. No. 12/827,971, Non-Final Office Action dated Dec. 26, 2012.
U.S. Appl. No. 12/828,045, Advisory Action dated Dec. 27, 2012.
U.S. Appl. No. 12/693,410, Non-Final Office Action dated Mar. 14, 2013.
U.S. Appl. No. 12/828,024, Non-Final Office Action dated Apr. 23, 2013.
U.S. Appl. No. 12/827,992, Non-Final Office Action dated Apr. 25, 2013.
U.S. Appl. No. 12/828,040, Final Office Action dated Jul. 15, 2013.
U.S. Appl. No. 12/827,971, Final Office Action dated Jul. 23, 2013.
U.S. Appl. No. 12/828,045, Non-Final Office Action dated Aug. 16, 2013.
U.S. Appl. No. 12/828,024, Final Office Action dated Oct. 4, 2013.
U.S. Appl. No. 12/693,410, Final Office Action dated Nov. 18, 2013.
U.S. Appl. No. 12/827,992, Final Office Action dated Dec. 5, 2013.
U.S. Appl. No. 12/827,971, Non-Final Office Action dated Dec. 24, 2013.
U.S. Appl. No. 12/693,410, Advisory Action dated Jan. 30, 2014.
U.S. Appl. No. 12/828,024, Non-Final Office Action dated Feb. 12, 2014.
U.S. Appl. No. 12/828,045, Final Office Action dated Apr. 2, 2014.
U.S. Appl. No. 12/828,040, Non-Final Office Action dated Apr. 21, 2014.
U.S. Appl. No. 12/827,971, Final Office Action dated Jul. 2, 2014.
U.S. Appl. No. 12/693,410, Non-Final Office Action dated Oct. 1, 2014.
U.S. Appl. No. 12/827,992, Non-Final Office Action dated Nov. 5, 2014.
U.S. Appl. No. 12/827,984, Non-Final Office Action dated Dec. 2, 2014.
U.S. Appl. No. 12/828,040, Final Office Action dated Dec. 4, 2014.
U.S. Appl. No. 12/828,045, Non-Final Office Action dated Jan. 30, 2015.
U.S. Appl. No. 12/827,992, Final Office Action dated Feb. 27, 2015.
U.S. Appl. No. 12/828,024, Non-Final Office Action dated Apr. 6, 2015.
U.S. Appl. No. 12/827,984, Final Office Action dated May 27, 2015.
U.S. Appl. No. 12/693,410, Final Office Action dated Jul. 15, 2015.
U.S. Appl. No. 12/827,971, Non-Final Office Action dated Sep. 17, 2015.
U.S. Appl. No. 12/828,045, Final Office Action dated Oct. 8, 2015.
U.S. Appl. No. 12/828,024, Final Office Action dated Nov. 25, 2015.
U.S. Appl. No. 12/827,984, Non-Final Office Action dated Dec. 3, 2015.
U.S. Appl. No. 12/828,040, Notice of Allowance dated Feb. 10, 2016.
U.S. Appl. No. 12/827,992, Non-Final Office Action dated Feb. 12, 2016.

(56) References Cited

OTHER PUBLICATIONS

U.S. Appl. No. 12/828,045, Non-Final Office Action dated Mar. 28, 2016.
U.S. Appl. No. 12/693,410, Non-Final Office Action dated Apr. 22, 2016.
U.S. Appl. No. 12/827,971, Final Office Action dated May 9, 2016.
U.S. Appl. No. 12/828,024, Non-Final Office Action dated May 17, 2016.
U.S. Appl. No. 12/827,984, Final Office Action dated May 27, 2016.
Chinese Patent Office, Application No. 201180022278.3, Foreign Office Action dated Jul. 28, 2014.
Chinese Patent Office, Application No. 201180022278.3, Foreign Office Action dated Mar. 13, 2015.
Chinese Patent Office, Application No. 201180022278.3, Foreign Office Action dated Nov. 25, 2015.
Chinese Patent Office, Application No. 201180022278.3, Pending Claims as of Jul. 28, 2014.
Chinese Patent Office, Application No. 201180022278.3, Pending Claims as of Mar. 13, 2015.
Chinese Patent Office, Application No. 201180022278.3, Pending Claims as of Nov. 25, 2015.
David Ender, "Data Streaming", Vienna Symphonic Library, Oct. 2007, http://community.vsl.co.at/blogs/faq_vi_misc/archive/2007/10/01/Disk-streaming.aspx.
European Patent Office, Application No. 11735054.6, Extended European Search Report dated Feb. 24, 2014.
European Patent Office, Application No. 11735054.6, Foreign Office Action dated Dec. 8, 2015.
European Patent Office, Application No. 11735054.6, Pending Claims as of Feb. 24, 2014.
European Patent Office, Application No. 11735054.6, Pending Claims as of Dec. 8, 2015.
iFusion, "Smart Station", User's Manual, dated 2011, 26 pages.
Macrumors, "PDanet Battery Drain Even When Charging", http://forums.macrumors.com/showthread.php?t=839238, Post #2, dated Dec. 24, 2009, 2 pages.
Pash, Adam, "Automate Proximity and Location-Based Computer Actions", http://lifehacker.com/265822/automateproximity-and-location+based-computer-actions dated Jun. 5, 2007, 8 pages.
Singapore Patent Office, Application No. 201206286-5, Pending Claims as of Aug. 2, 2013.
Singapore Patent Office, Application No. 201206286-5, Search Report and Written Opinion dated Aug. 2, 2013.
Waybackmachine, "Motorola Q Cell Phone Instruction Manual", Available as of Feb. 28, 2008, http://www.accessible-devices.com/MotorolaQManual.html, 49 pages.
U.S. Appl. No. 12/827,992, Final Office Action dated Sep. 12, 2016.
U.S. Appl. No. 12/828,045, Final Office Action dated Sep. 26, 2016.
U.S. Appl. No. 12/693,410, Final Office Action dated Oct. 6, 2016.
U.S. Appl. No. 12/827,971, Non-Final Office Action dated Oct. 27, 2016.
Extended EP Search Report from EP Application No. 18209681 dated Feb. 4, 2019.
Extended EP Search Report from EP Application No. 18209680 dated Feb. 1, 2019.
Yi Cui et al., "Seamless User-Level Handoff in Ubiquitous Multimedia Service Delivery" Multimedia Tools and Applications, Kluwer Academic Publishers, vol. 22, pp. 137-170 Feb. 1, 2004.
Extended EP Search Report from EP Application No. 18209678.4 dated Jan. 4, 2019.

* cited by examiner

400
SERVER
430
INTERNET
428
ISP
426
LOCAL
NETWORK
422
HOST
424
NETWORK
LINK
420
STORAGE
DEVICE
410
ROM
408
MAIN
MEMORY
406
BUS
402
COMMUNICATION
INTERFACE
418
PROCESSOR
404
DISPLAY
412
INPUT DEVICE
414
CURSOR
CONTROL
416

PLAYING MULTIMEDIA CONTENT ON MULTIPLE DEVICES

CROSS-REFERENCE TO RELATED APPLICATIONS; BENEFIT CLAIM

This application is a continuation of U.S. application Ser. No. 12/828,040, filed Jun. 30, 2010, which is a continuation of U.S. application Ser. No. 12/693,410, filed Jan. 25, 2010, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to user interface devices. Specifically, the invention relates to concurrent use of multiple user interface devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In general user interface systems found in televisions, laptops, tablets, phones, kiosks, or most other devices include a display screen and an interactive interface. The interactive interface may include physical control buttons (e.g., buttons found on remote controls, a mouse, a joystick, a keyboard, etc.).

As shown in FIG. 1, in some systems, a touch screen remote control (10) may be used to operate a media device (e.g., video cassette recorder (VCR) (20)) which outputs media content (35) displayed on a separate display screen (30). The remote control (10) executes a remote control operating system and displays a touch screen menu (15) specifically designed for and displayed exclusively on the remote control (10). The communicatively coupled media device (20) receives user commands submitted to the remote control (10) and displays media content (35) (e.g., a movie or a show) based on the user command selected on the remote control (10).

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
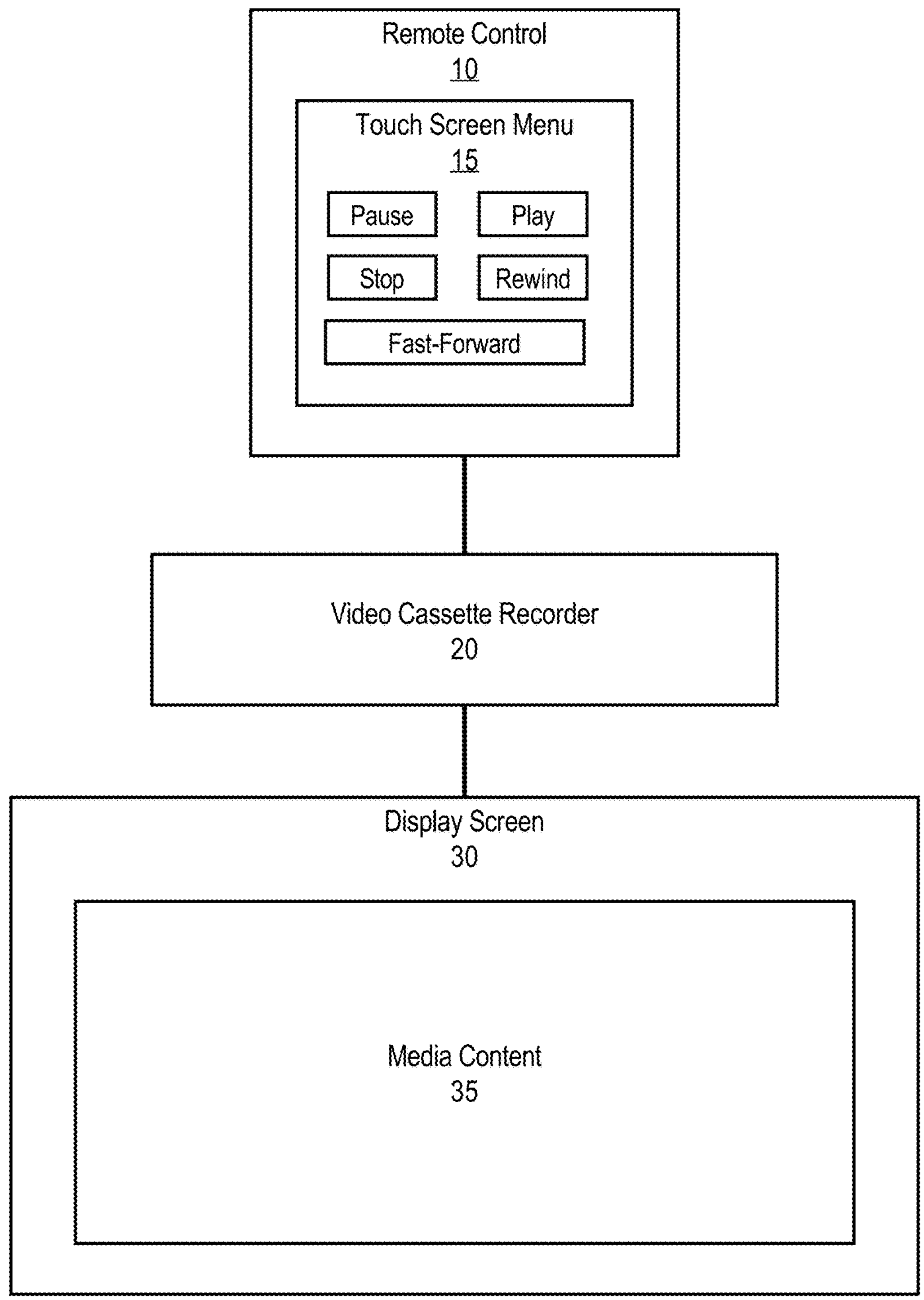
FIG. 1 is a block diagram illustrating a prior art system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features are described according to the following outline:

1.0 FUNCTIONAL OVERVIEW
2.0 SYSTEM ARCHITECTURE
3.1 CONTENT MANAGEMENT—SIMILAR AND NON-SIMILAR DISPLAYS
3.2 CONTENT MANAGEMENT—SPATIAL AND TEMPORAL SPANNING
3.3 CONTENT MANAGEMENT—ALTERNATE CONTENT
3.4 CONTENT MANAGEMENT—INFORMATIONAL CONTENT/SPONSORED CONTENT
3.5 CONTENT MANAGEMENT—ALERTS/NOTIFICATIONS
3.6 CONTENT MANAGEMENT—TIME DELAY
3.7 CONTENT MANAGEMENT—IMAGE LAYER SELECTION
3.8 CONTENT MANAGEMENT—AUDIO
3.9 CONTENT MANAGEMENT—MULTIPLE SECONDARY USER INTERFACE DEVICES
4.0 USER INTERFACE DEVICE—EXAMPLE IMPLEMENTATION
5.0 COMMAND EXECUTION—EXAMPLE IMPLEMENTATION
6.0 HARDWARE OVERVIEW
6.0 EXTENSIONS AND ALTERNATIVES

1.0 Functional Overview

In an embodiment, a method includes: transmitting multimedia content for display on a first user interface device; concurrently transmitting related content for display on a second user interface device, at least a portion of the multimedia content and at least a portion of the related content being similar or identical; obtaining user input received at the second user interface device; performing an operation associated with the multimedia content displayed on the first user interface device, based on the user input received at the second user interface device; wherein the method is performed by at least one device comprising a processor.

Transmitting the multimedia content for display on the first user interface and concurrently transmitting the related content for display on the second user interface may be performed by the same device.

The method may include selecting a spatial portion of a frame in the multimedia content as a whole frame in the related content. The spatial portion of the frame in the multimedia content may be selected as the whole frame in the related content in response to detecting that the spatial portion comprises a menu. The spatial portion of the frame in the multimedia content may be selected as the whole frame in the related content based on the user input.

The related content may include the multimedia content with additional content overlaid on the multimedia content. The related content may include an alternate version of the multimedia content displayed on the first user interface device. The related content may include advertisements for products or services within the multimedia content displayed on the first user interface device. The related content may include information describing one or more image attributes within the multimedia content displayed on the first user interface device.

In an embodiment, a method includes: causing displaying of a first menu on the first user interface device; transmitting a second menu to a second user interface device for display on the second user interface device, at least a portion of the first menu and at least a portion of the menu being similar or identical; obtaining a menu selection received at the second user interface device; performing an operation associated with multimedia content displayed on the first user interface device, based on the menu selection received at the second user interface device; wherein the method is performed by at least one device comprising a processor. The first user interface device may be a non-touch screen interface and the second user interface device may be a touch screen interface.

In an embodiment, a method includes: transmitting multimedia content to a first user interface device and a second user interface device for concurrent display; selecting one of the first user interface device and the second user interface device to display additional content; transmitting the additional content to the selected user interface device for display on the selected user interface device. The additional content may be overlaid on the multimedia content for display on the selected user interface device. The additional content may be displayed in response to receiving a request for the additional content on the selected user interface device.

In an embodiment, the additional content may include an alert notification. The alert notification may be displayed on the first user interface device and detailed information associated with the alert notification is displayed on the second user interface device. The selecting step may include selecting the second user interface device, and the method may include subsequent to a specified time interval of not receiving user input at the second user interface device in response to displaying the alert notification on the second user interface device: displaying the alert notification on the first user interface device.

One of the first user interface device and the second user interface device may be selected based on a type of the additional content or a source of the additional content.

In an embodiment, the method includes: displaying video content comprising a plurality of frames, each frame overlaid with a menu on a first user interface device; concurrently with displaying the video content on the first user interface device, displaying a single frame of the plurality of frames overlaid with the menu, on a second user interface device; receiving user input at the second user interface device; performing an operation associated with the video content displayed on the first user interface device based on the user input received at the second user interface device. The video content and the single frame from the video content may be received by the first user interface device and the second user interface device, respectively, from a same content source.

In an embodiment, a method includes: a media device transmitting multimedia content to a user interface for displaying of the multimedia content on the television; the media device transmitting the multimedia content to a cellular telephone for displaying of the multimedia content on the cellular telephone; the user interface and the cellular telephone concurrently displaying the multimedia content received from the media device. At least one of the frame rate and the resolution for displaying the multimedia content on the user interface may be different than the frame rate and the resolution for displaying the multimedia content on the cellular telephone.

In an embodiment, a method includes: transmitting multimedia content to a first user interface device for display on the first user interface device; concurrently with transmitting the multimedia content to the first user interface device, receiving a first message associated with a user from a web server; transmitting information associated with the first message to a second user interface device for display on the second user interface device; wherein the method is performed by at least one device comprising a processor. The second user interface device may be a cellular telephone displaying a text message based on the information associated with the first message. The method may further include receiving a second message from the second user interface device based on user input and transmitting information associated with the second message to the web server.

In an embodiment, a method includes: playing multimedia content only on a first user interface device of a first user interface device and a second user interface device; detecting that the second user interface device has moved outside of the specified distance from the first user interface device; in response to detecting that the second user interface device has moved to outside of the specified distance, playing the multimedia content on the second user interface device. The method may further include: in response to detecting that the second user interface device has moved to outside of the specified distance, stopping playing of the multimedia content on the first user interface device. The method may further include subsequent to the playing the multimedia content on the second user interface device, detecting that the second user interface device has moved back within the specified distance from the first user interface device; in response to detecting that the second user interface device is moved back within the specified distance from the first user interface device, stopping playing of the multimedia content on the second user interface device.

Although specific components are recited herein as performing the method steps, in other embodiments agents or mechanisms acting on behalf of the specified components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

2.0 System Architecture

Although a specific computer architecture is described herein, other embodiments of the invention are applicable to any architecture that can be used to perform the functions described herein.

FIG. 1 shows an example system in accordance with one or more embodiments. The content system (100) includes one or more media devices that function as content sources (110), user interface devices (115), and/or content management devices (130). Each of these components are presented to clarify the functionalities described herein and may not be necessary to implement the invention. Furthermore, components not shown in FIG. 1 may also be used to perform the functionalities described herein. Functionalities described as performed by one component may instead be performed by another component.

In an embodiment, the content system (100) may include media devices that function as content sources (110). Content sources (110) generally represent any source of audio and/or visual content. Examples of content sources (110) may include a Digital Video Disc player that reads data from a Digital Video Disc (DVD) or a video cassette recorder (VCR) that reads data from a video cassette. Other examples include a digital video recorder, a set-top box, a computer system, a media device, a local server, a web server, a data repository, a kiosk, a mobile device, or any other source of content. The content system (100) may also receive content from other content systems. The content system (100) may include one or more components which allow the content system to (100) receive and/or transmit content. For example, the content system (100) may include a network card, a tuner, a compressor, a de-compressor, a modem, an encryption device, a de-encryption device, a multiplexer, a demultiplexer, a receiver, or any component involved in receiving or transmitting data. In an embodiment, the content system (100) may receive and/or transmit content over wired and/or wireless segments. For example, the content system (100) may receive content on a broadcast stream, a network stream (e.g., internet, intranet, local area network), a Bluetooth signal, an infrared signal, any suitable frequency in the electro-magnetic spectrum and/or via any other accessible method of receiving content from or transmitting content to devices within the content system (100) or outside of the content system (100).

In an embodiment, the content system (100) may include media devices that function as user interface devices (115). A user interface device (115) generally represents any device with input and/or output means. A user interface device (115) may include one or more of: a display screen, a touch screen interface, a keypad, a mouse, a joystick, a scanner, a speaker, an audio input, an audio output, a camera, etc. Examples of user interface devices (115) include monitors, television sets, projectors, mobile device interfaces, kiosks, tablets, laptops, speakers, headphones or any other devices which may be used to receive and/or present audio content and/or visual content. In an embodiment, at least one of the user interface devices (115) within the content system (100) may be configured to receive input from a user.

In an embodiment, a user interface device (115) may be configured to automatically detect user interaction elements in a display. For example, a secondary user interface device may be configured to display a menu concurrently displayed on a primary user interface device. The secondary user interface device may automatically identify "buttons" within the menu as user interaction elements (e.g., by optical character recognition, button shape recognition, color based identification, etc.). The secondary user interface device may obtain identify user interaction elements displayed on screen based on data identifying the user interaction elements. For example, the x and y coordinates on a display identifying the corners of a button may be received. Another example, may involve receiving the images or features of the buttons separately that can be compared to a menu screen to identify matching elements. The matching elements may then be identified as user interaction elements.

The user interaction elements may be visually indicated to a user. For example, the user interaction elements may be overlaid with special shading, colors, lines, or other suitable visual clues which can identify the user interaction elements. The secondary user interface may then allow a user to select the automatically identified buttons. For example, on a touch screen secondary user interface, the automatically identified buttons may be touched by a user to select the buttons. Alternatively, a keypad (or other input means) on the secondary user interface may be used to select the automatically identified buttons displayed on the secondary user interface. In an embodiment, the user interface device may detect text input fields (e.g., by detecting white boxes or a cursor in displayed content), a scroll bar (e.g., by detecting opposing arrows along a vertical column in displayed content), a radio button selection (e.g., by detecting a set of vertically oriented circles or squares in displayed content), or any other interface components that may be used to obtain user input. The secondary user interface may be configured to transmit information associated with user input to another component (e.g., the content management device (130)) of the content system (100).

In an embodiment, different types of user interface devices (115) may be used concurrently in the content system (100). Different resolutions and/or frame rates may be used for displaying content on different user interface devices. In an embodiment, one user interface device may be referred to herein as a primary user interface device and another user interface device may be a secondary or ancillary user interface device for clarity. However, the functionality described herein pertaining to a particular user interface device may be applicable to another user interface device. Accordingly, reference to a primary user interface device or a secondary user interface device should not be construed as limiting in scope.

3.1 Content Management—Related Content

Figure 3A:
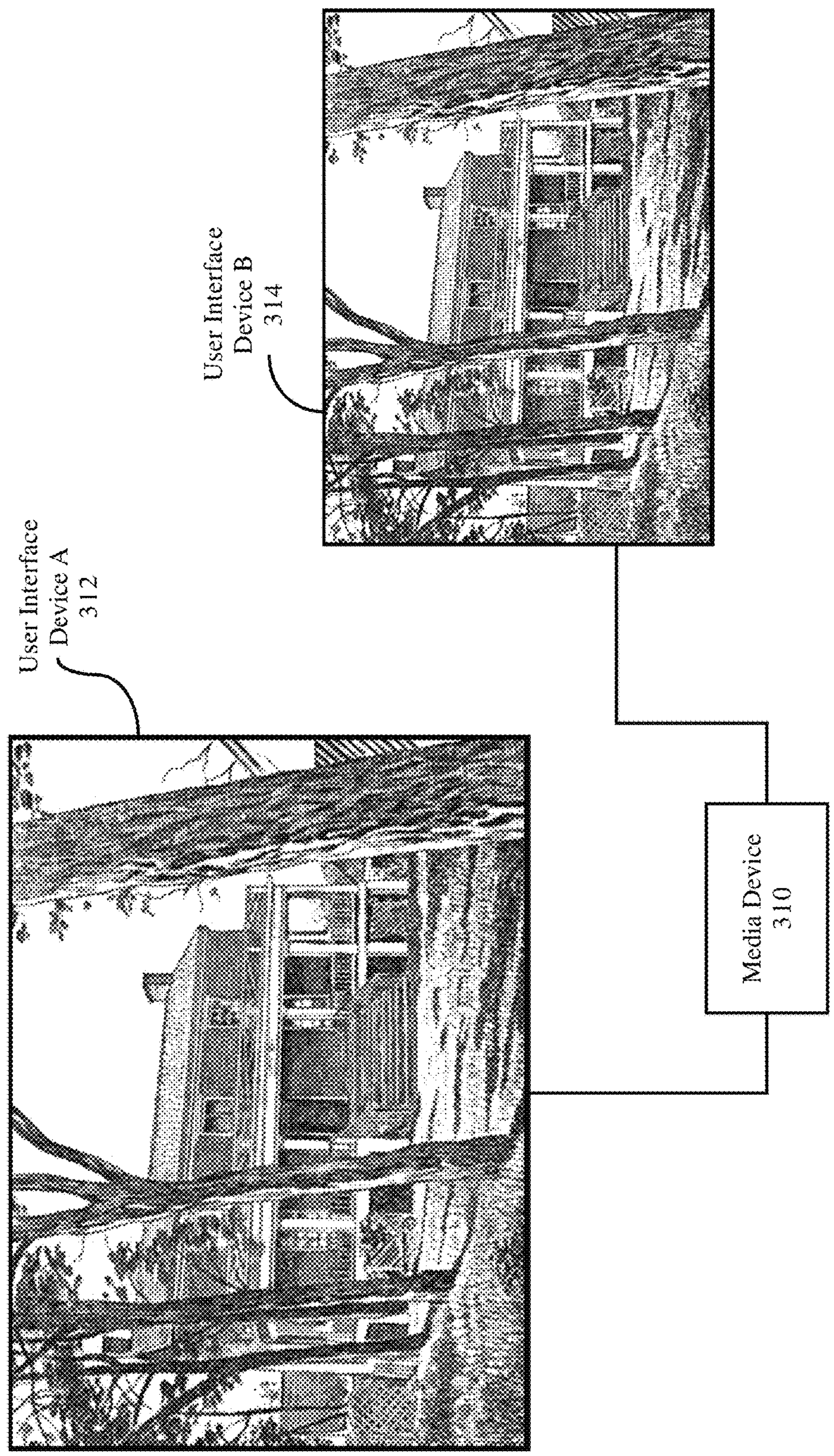
FIGS. 3A-3G illustrate example screen shots in accordance with one or more embodiments.

In an embodiment, the content system (100) may include media devices that function as content management devices (130). Content management devices (130) determine what content is to be played on each user interface device of a set of user interface devices. For example, a content management device (130) may be configured to display media content concurrently on a primary user interface device and a secondary user interface device. As shown in example FIG. 3A, the media content transmitted by a media device (310) may be shown concurrently on user interface device A (312) and user interface device B (314). The video content may be displayed by the content management device (130) at the different user interface devices with different resolution and/or frame rates. The content management device (130) may be a separate device or part of media device (310) that outputs the media content.

Figure 3B:
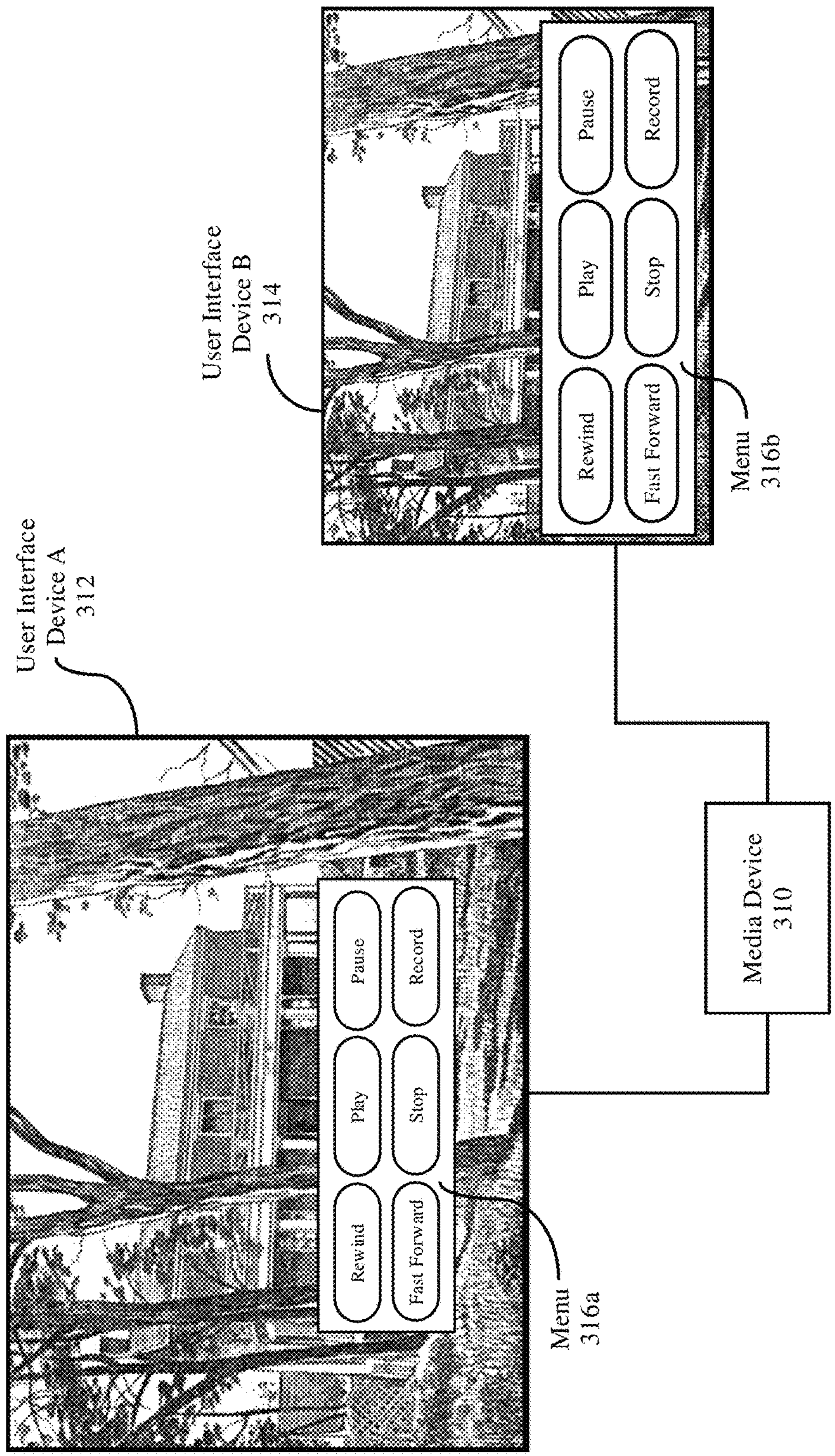

In an embodiment, multimedia content may be displayed on user interface device A (312) concurrently with related content being displayed on user interface device B (314). Multimedia content shown on user interface device A (312) may be concurrently shown on user interface device B (314) with slight modifications (e.g., related content). For example, text or other specified content may be shown at different sizes, in relation to the underlying images or graphics, on different user interface devices. For example, as shown in FIG. 3B, the user interface device A (312) may display multimedia content overlaid with a menu (316*a*) for operating media device (310). The user interface device B (314) may be configured to display the same multimedia content overlaid with a larger version of the menu (316*b*) in relation to the underlying media content. The user interface device B (314) may be touch screen that visually indicates that the menu buttons are selectable by, for example, bolding the button outlines.

In an embodiment, user input may be received on user interface device B (314) and an operation related to the multimedia content displayed on the user interface device A (312) may be performed. For example, a user may select pause or fast forward on a menu (316*b*) displayed on user interface device B (314) while multimedia content is being concurrently displayed on both of user interface device A (312) and user interface device B (314). In response to receiving the user input, the multimedia content may be paused or fast forwarded. The user input may be received to operate any of the devices (e.g., media devices, user interface devices, etc.). Input receiving on user interface device may be for that user interface device, for multiple user interface devices, and/or for one or more media devices.

Figure 3C:
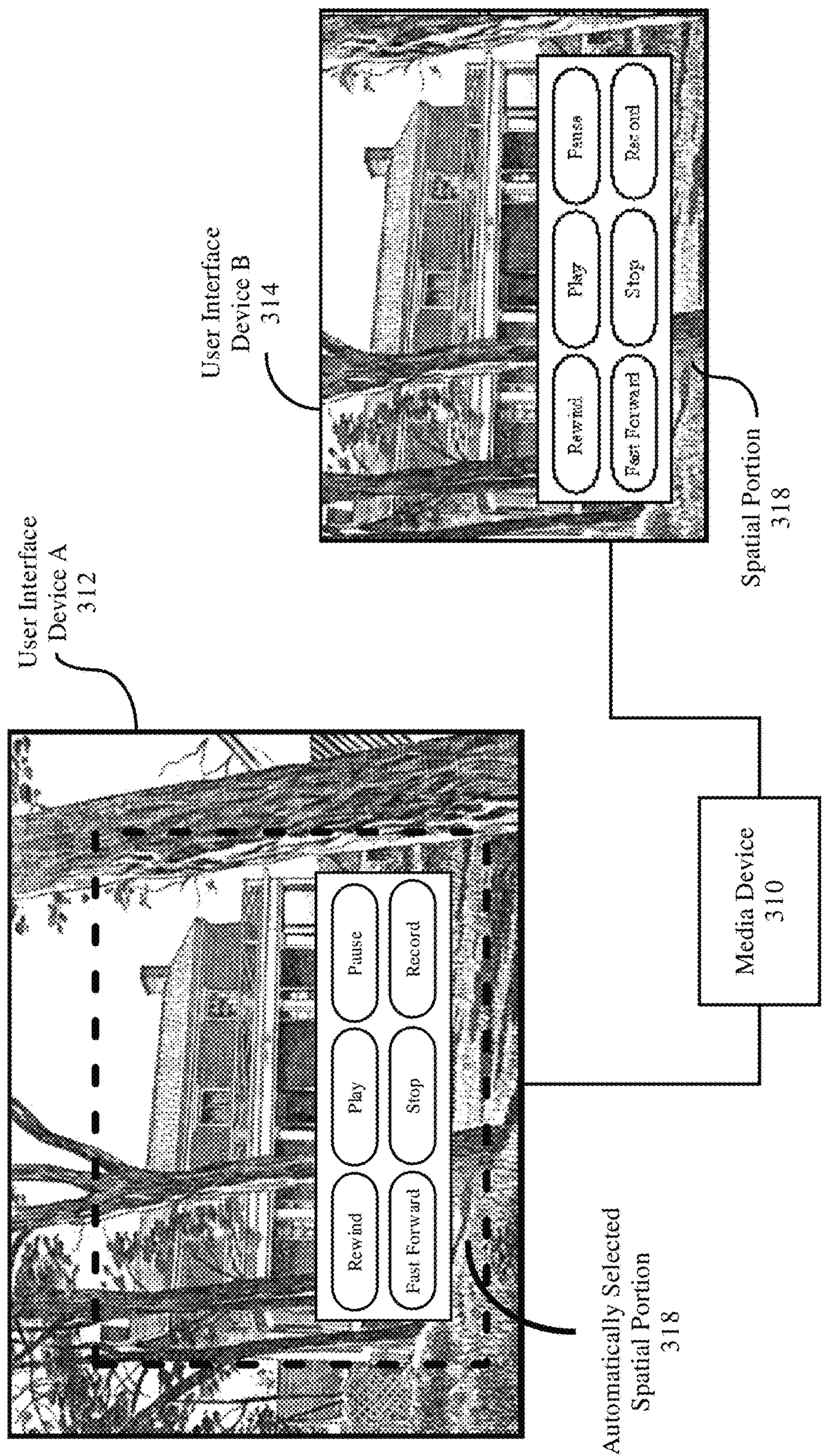

In an embodiment, only an automatically selected spatial portion of the media content is displayed on the secondary user interface device, while the media content in its entirety is concurrently displayed on the primary user interface device. For example, as shown in example FIG. 3C, the content management device (130) may be configured to display a menu overlaid on media content on a user interface device A (312). The content management device (130) may further be configured to display only a spatial portion (318) of the media content that includes the menu on user interface device B (314). The menu may be generated by the media device (310) that is providing the media content for display or may be generated by and correspond to another media device. For example, the media content may be received from a first content source (110) and the menu (e.g., with options related to brightness, color, sharpness, etc.) may be generated by a primary user interface device and overlaid on top of the media content received from the first content source (110). The content management device (130) may be configured to obtain the menu generated by the primary user interface device and display the menu on a secondary user interface that includes functionality to receive input from a user.

In an embodiment, a primary user interface device is designed for standard display at a distance from a user. For example, the primary user interface device may be a Liquid Crystal Display mounted on a wall. The secondary user interface device is designed as a mobile device (e.g., a cell phone, a tablet PC, a laptop, or other suitable mobile device). In an embodiment, the formatting of the content on the secondary user interface (e.g., the mobile device) may vary based on distance from the primary user interface. For example, radio frequencies or other suitable technology may be used to determine the distance between the primary user interface device and the secondary user device. The text displayed on the primary user interface device may be visible to a user, as the primary user interface may include a large display screen. Furthermore, assuming that the user is within an estimated distance (e.g., 1 foot) from the secondary user interface device, an estimate of the distance between the user and primary user interface device may be generated. Based on the estimated distance between the user and primary user interface device, a size of the text as viewed by the user on the primary user interface device may be determined. The text on the secondary user interface may then be enlarged or shrunk to produce the same visual effect for the user viewing the secondary user interface as when viewing the primary user interface device.

3.2 Content Management—Spatial and Temporal Spanning

Figure 3D:
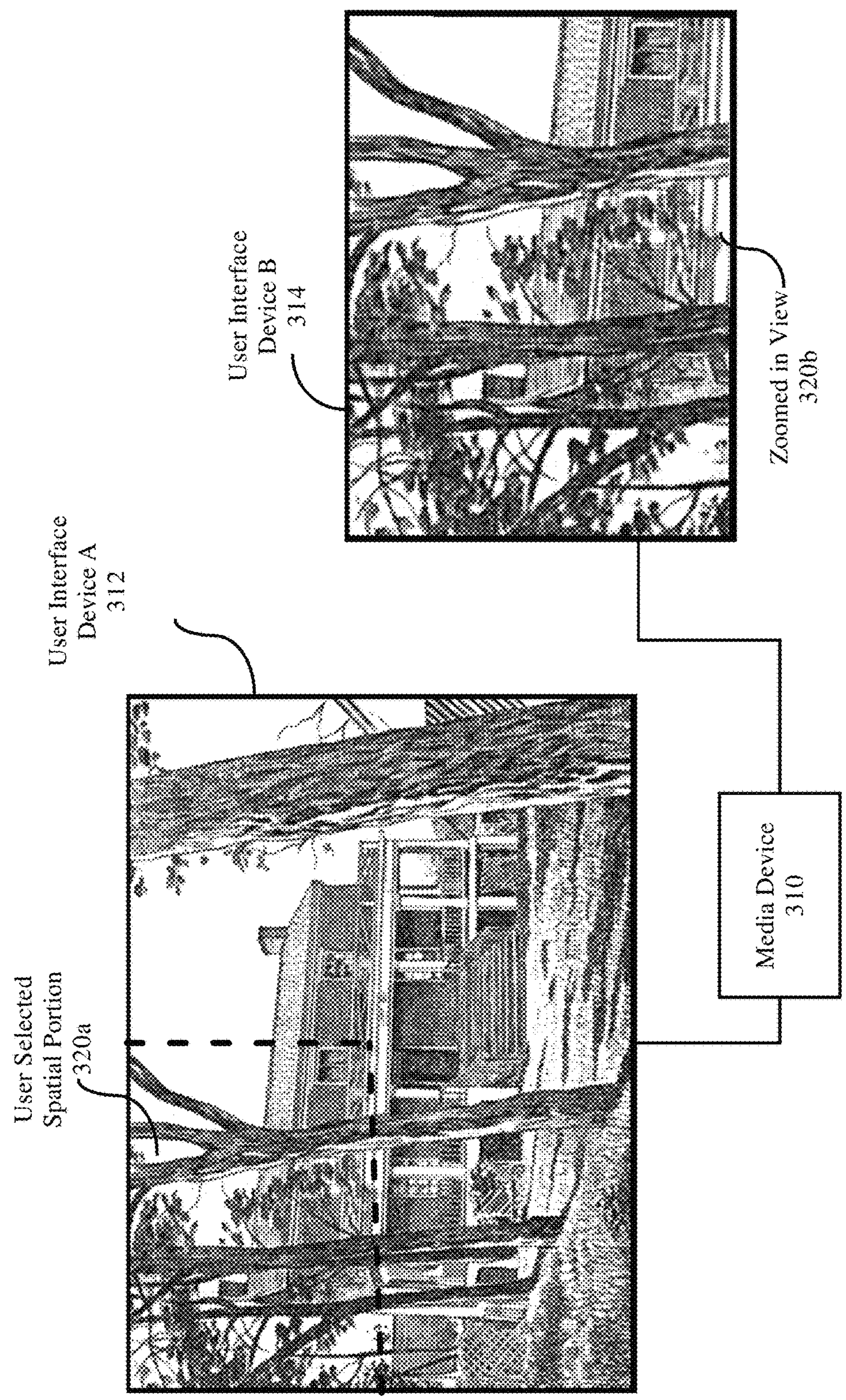

In an embodiment, the user may use the secondary user interface device to zoom in on any particular spatial portion of the primary user interface device. For example, as shown in FIG. 3D, user input may be used to select a spatial portion (320*a*) of the current display on user interface device A (312). The user input selecting the spatial portion may be entered on the user interface device B (314) or any other device. For example, a user may first select a zoom level on user interface device B (314) which results in a zoomed in version of the image currently shown on user interface device A (312). Thereafter, the user may slide a finger on user interface device B (314) signaling the movement of user selected spatial portion (320*a*) in user interface device A (312) to the top left corner. As a result, the zoomed in view (320*b*) of the selected spatial portion (320*a*) is displayed on user interface device B (314).

In an embodiment, both user interface devices may continue to concurrently display the media content, with the primary interface device displaying the media content in entirety and the secondary interface device displaying a spatial portion of the media content. Furthermore, the secondary user interface device may be configured to pan to another spatial portion of the media content based on user input.

In an embodiment, the secondary user interface device may be used to temporally scan the media content being displayed on the primary user interface. For example, the content management device (130) may initially display the multimedia content, concurrently and synchronously, on the primary user interface device and the secondary user interface at standard playback speed. The secondary user interface device may then be configured based on user input to fast forward, rewind, or pause the playing of the media content while the primary user interface device continues playing the multimedia content at standard playback speed. The secondary user interface device may accordingly allow a particular user to review, skip, or otherwise modify playback on the secondary user interface device while the playing of multimedia content on the primary user interface device is not interrupted. In an embodiment, the secondary user interface device may also include a synchronization option, which synchronizes playing of the multimedia content on the secondary user interface device with the primary user interface device. For example, the secondary user interface device may start receiving the exact same video stream from a media device as the first user interface device and display frames synchronously with the first user interface device. In another example, the second user interface device may simply resume playing of the multimedia content at a frame that is currently being displayed on the first user interface device.

In an embodiment, the video streams for both the primary user interface device, showing the standard video stream, and the secondary user interface being used for temporal or spatial spanning are received from a single source of media content. For example, for spatial spanning, a media device may output the same video stream to both the primary user interface device and the secondary user interface device. The primary user interface device displays the video stream as received, while the secondary user interface may be configured to display only a spatial portion of the video stream being received. Temporal spanning may involve a media device outputting a video stream in advance to the secondary user interface, and the secondary user interface buffering the video stream. The frames stored in the buffer may then be temporally panned by a user using the secondary user interface device.

3.3 Content Management—Alternate Content

The content management device (130) may be configured to display and/or play different version of multimedia content on different user interface devices (115). For example, during a showing of an R-Rated movie, the content management device (130) may be configured to display a censored version of the R-Rated movie on a primary user interface available for viewing to all audiences. The content management device (130) may further be configured to concurrently display a non-censored version of R-Rated movie on a secondary user interface device (115) (e.g., a hand held device configured for an adult viewer).

In an embodiment, the content management device (130) may receive two different but related content streams for displaying on the two user interface devices (115). In this case, the content management device (130) may simply be configured to concurrently display each content stream on the corresponding user interface device (115). In an embodiment, the content management device (130) may receive a single content stream for concurrently displaying on multiple user interface devices. In this case, the content management device (130) may automatically censor content for one user interface device while not censoring the same content concurrently displayed on a second user interface device.

In an embodiment, the content management device (130) may concurrently display the same video stream on multiple user interface devices while playing different audio streams on the multiple user interface devices. For example, the different user interface devices may play corresponding audio in different languages. In another example, one user interface device may play uncensored audio corresponding to the video stream while another user interface device may play censored audio corresponding to the concurrently playing video stream.

3.4 Content Management—Informational Content/Sponsored Content

In an embodiment, the content management device (130) may be configured to display multimedia content on a primary interface device and display related content on a secondary interface device. The related content may include actor information, plot synopsis, scene information, geographic information, etc. or any other information associated with the multimedia content. In an embodiment, the content management device (130) may receive metadata with multimedia content, where the content management device (130) is configured to display the multimedia content on one user interface device and present the metadata on the other user interface device. The information displayed on the secondary interface device may be obtained by the content management device (130) in response to a request for that particular information based on a user request. For example, a user may request identification of a structure or a geographic scene or other information related to the media content being presented. As shown in example FIG. 3E, user interface device A (312) may show the content without any additional information, while user interface device B (314) may be annotated with additional information (322) about the structure shown in media content. A display of other information (e.g., actor information, producer information) may be shown on user interface device B (314) without concurrently displaying the media content (e.g., the image of the house) shown in user interface device A (312). The additional information may also include plot information (e.g., identifying characters in the plot line, good or evil characteristics, scenes, etc.) that can help viewers (e.g., senior citizens or children) understand a complex storyline.

In an embodiment, the information presented on the secondary user interface device may be sponsor information associated with the multimedia content displayed on the primary media interface. The information concurrently presented on the secondary user interface may be suggestions to the user for additional media content that is related (e.g., similar genre, actors, directors, producers, language, etc.) to the multimedia content displayed on the primary user interface. In an embodiment, products and/or services featured in media content displayed on the primary user interface device may be displayed on the secondary user interface. For example, when a movie showing an actor using a particular cell phone is being shown on the primary user interface device, information associated with the particular cell phone may be displayed on the secondary user interface device.

3.5 Content Management—Alerts/Notifications

In an embodiment, the content management device (130) may be configured to display visual alerts or play audio alerts on a first user interface device but not the second user interface device. In an embodiment, multiple secondary display devices may be configured to display the same content as displayed on a primary display device. In addition, each of the multiple secondary display devices may display alerts or notifications for a user associated with that particular secondary display device. For example, a user may initially be watching content on the primary display device. Thereafter, a user may receive a personalized notification or alert overlaid on the same content being displayed on a secondary display device (e.g., tablet PC). The user may then switch to watching the content on the secondary display device while viewing the alert or information associated with the alert. The information associated with the alert may be overlaid on top of the content in a transparent mode, allowing the user to concurrently watch the content. The information associated with the alert may be displayed in a second window concurrently displayed with the original content in a first window.

In an embodiment, the content management device (130) may be configured to display visual alerts or play audio alerts initially on the first user interface device and after a specified time period or other condition, on the second user interface device. For example, if a user does not respond to the alert or otherwise indicate that the alert has been received on the first user interface within a specified period of time, the alert may be displayed or played on the second user interface.

Figure 3E:
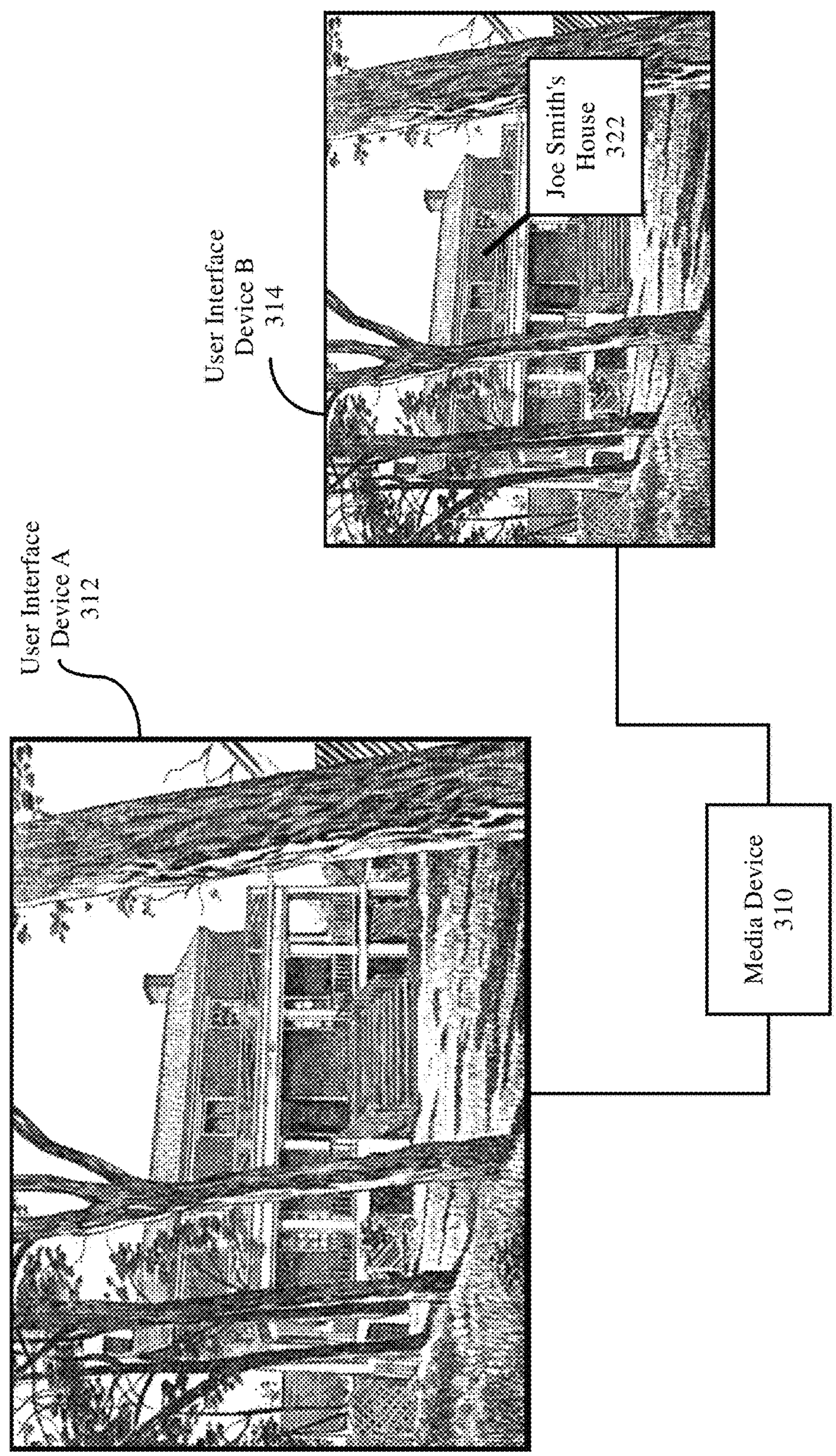
Figure 3F:
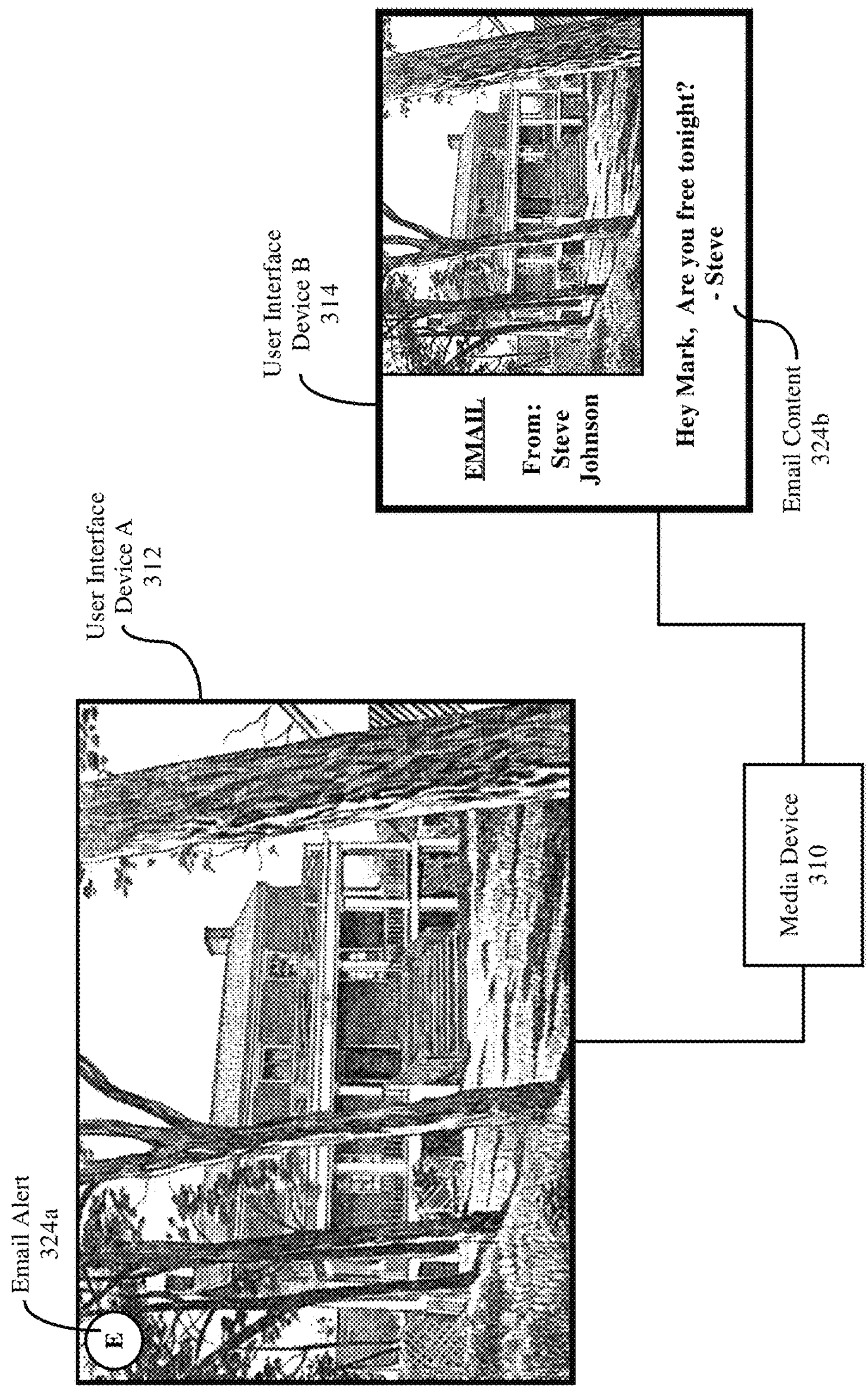

In an embodiment, an alert/notification may be displayed on one user interface device and consumed on another user interface device. For example, as shown in FIG. 3E, an email alert icon (324*a*) indicating that an email has been received may be displayed on user interface device A (312). The user interface device B (314) may then be used to display the email content (324*b*), e.g., in response to user input or automatically. The user interface device B (314) may be used to concurrently display multimedia content while the user reads the email message on user interface B (314).

3.6 Content Management—Time Delay

In an embodiment, the content management device (130) displays identical video streams on multiple user interface devices with a delay in time between multiple displays. For example, multimedia content may be displayed on a secondary media device ten seconds ahead of time, in comparison to the primary media device. An adult user may then provide input to censor or otherwise modify the content that will be displayed on the primary media device shown to all users. In an embodiment, a user may select the time delay for displaying a video stream between different user interface devices (115). An amount of time delay may be selected automatically by the content management device (130) based on the rating (e.g., General, Parental Guidance, Parental Guidance 13, etc.) of the media content.

3.7 Content Management—Image Layer Selection

In an embodiment, the content management device (130) may display a video stream overlaid with a menu on a primary user interface device concurrently with displaying a single frame of the video stream overlaid with the same menu on a secondary user interface device.

For example, the content management device (130) may initially display a video stream concurrently on both the first user interface device and the second user interface device. In response to receiving user input at the second user interface device (or at another device), the content management device (130) may obtain a snapshot of the frame being displayed on the two user interface devices when the user input is received. The content management device (130) may then be configured to display the snapshot of the frame overlaid with a menu on the secondary user interface device. Furthermore, the content management device (130) may continue to display the original video stream on the primary user interface device without any change. Alternatively, the content management device (130) may continue to display the original video stream with the menu overlaid on the original video stream, on the primary user interface device. The secondary user interface device, displaying the single frame (e.g., snapshot) may then allow a user to submit input selecting an option from the menu.

Figure 3G:
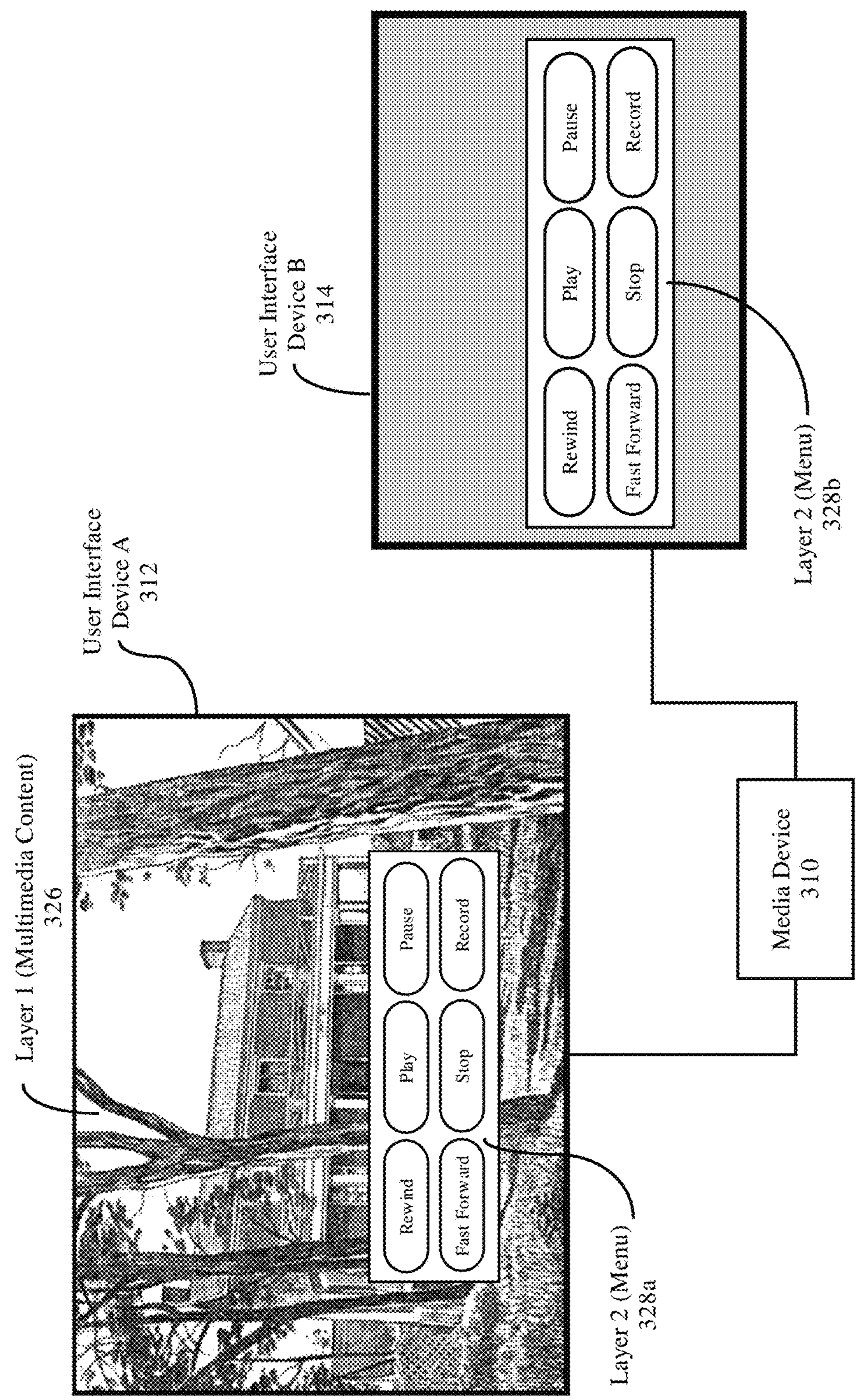

In an embodiment, the content management device (130) displays multiple layers of visual content on a user interface device. For example, as shown in FIG. 3G, the content management device (130) may display layer 1 (multimedia content) (326) overlaid with layer 2 (menu) on a first user interface device. The menu may be overlaid on multimedia content by first loading a frame from the multimedia content into a frame buffer and overwriting a portion of the frame buffer with data associated with the menu. The resulting content in the frame buffer may then be displayed on the user interface device A (312). The content management device (130) may further be configured to display a single layer (e.g., layer 2 (328*b*)) of the available layers on user interface device B (314). Accordingly, in the above example, only the menu or only the multimedia content may be concurrently displayed on the first user interface device and the second user interface device, while at least one other layer is displayed on the first user interface device.

In another example, a video stream may create the illusion of a still image overlaid on a video stream. A spatial portion (e.g., a bottom portion) of the video stream may include a non-changing image (e.g., a DVD menu), while another spatial portion (e.g., a top portion) may include a changing image (e.g., playing of a scene from a movie). In this illusion, although a video stream displayed on a media device may be included in a single video content stream, the appearance of a still image overlaid on video content may be created on a primary user interface device. In this example, a snapshot of a single frame from the video stream on the primary user interface device may be displayed on a secondary user interface device until user input is received.

3.8 Content Management—Audio

In an embodiment, the content management device (130) may manage sound differently for different user interface devices (115). For example, a default setting may route all sound associated with multimedia content being concurrently displayed on a primary user interface device and the secondary interface device, to the primary user interface device. The secondary user interface device may be automatically activated when the secondary user interface device is moved to a distance greater than a specified amount from the primary user interface device. For example, a user may be watching a television program on a primary user interface device (e.g., a plasma screen mounted on a wall) when a phone rings in another room. The user may then walk away from the primary user interface device, with the secondary user interface device (e.g., a mobile device) in hand, to get the phone. When the secondary user interface device, that is concurrently displaying the same content as the primary user interface device, is further than a specified distance from the primary user interface device, the audio (and/or video) on the secondary user interface device is automatically activated. In this example, the user is able to continue watching and listening to the playing of the multimedia content in the other room. In an embodiment, the video feed may function in a similar manner. For example, the secondary user interface device may display video stream concurrently or instead of the primary user interface device, when the secondary user interface device is further than a specified distance from the primary user interface device. In an embodiment, the video and/or audio may switch back to the primary user interface device when the secondary user interface device returns within the specified distance from the primary user interface device.

In an embodiment, the secondary user interface device may be used by default for audio when the content system (100) is first turned on. For example, when a user turns on a content system (100) in the bedroom, the primary user interface device may only display video with the audio being played on a secondary user interface device. Thereafter, the user may provide input to the content management device (130) to turn on the audio on the primary user interface device.

In an embodiment, a secondary user interface device may be used to provide an additional audio stream. For example, the primary user interface device may play a video stream with the corresponding audio. However, a particular user (e.g., a person with a hearing disability) may want a higher volume. The particular user may increase the volume for audio played on a secondary user interface device close to the particular user to personalize the user experience. In an embodiment, multiple secondary user interfaces may be used concurrently with the primary user interface, where each secondary user interface is configured to play audio at a volume selected for that particular secondary user interface. Using a system of multiple secondary user interfaces with audio output, allows each user to individually select a volume level.

Although, this section presents specific examples related to audio content management, techniques used for visual content management described in other sections may be applicable to audio content. Furthermore, examples related to audio content management described in the current section may applicable to visual content.

3.9 Content Management—Multiple Secondary User Interface Devices

In an embodiment, multiple secondary user interface devices may be used concurrently with a primary user interface device. For example, in an embodiment, media content may be displayed on the primary user interface device and two or more secondary user interface devices. A user may perform functions related to the media content on a corresponding secondary user interface device. For example, each user may zoom in, temporally pan, spatially pan, request information, or perform any other suitable function on a corresponding secondary user interface device without affecting the primary user interface device or other user interface devices. Each user may personalize or otherwise configure a respective secondary user interface device for alerts, notifications, messages, etc. Different secondary user interface devices may be configured differently and/or display different content in addition to the common content displayed on the primary user interface device.

In an embodiment, a primary user interface device and multiple secondary user interface devices may be used in a gaming environment. For example, a primary user interface device may show an environment viewable by all players, such as a combat environment where multiple players interact. The gaming environment displayed on the primary user interface may also show multiple first person views corresponding to different players. In addition, special weapons, abilities, functions, assets, or any other gaming attributes for a particular player may be displayed only on a secondary gaming device associated with the particular player. In another example, the primary user interface may display cars racing through a city (may include a separate view corresponding to each player) and the secondary user interface for each player may include special speed enhancing tools, weapons, or other gaming features.

4.0 User Interface Device—Example Implementation

In an embodiment, a user interface device, described above, is implemented as a remote control device that is communicatively coupled with at least one of the components in the content system. In an embodiment, the remote control device may be a cellular telephone or other mobile device. In an embodiment, the remote control device may be implemented as any mobile device or hand held device with a touch screen interface. Although a specific structure is described herein for implementing the user interface device (e.g., primary user interface device or secondary user interface device), any other structure may be used. Any specific components described herein should not be construed as limiting the scope of the user interface device.

Figure 2A:
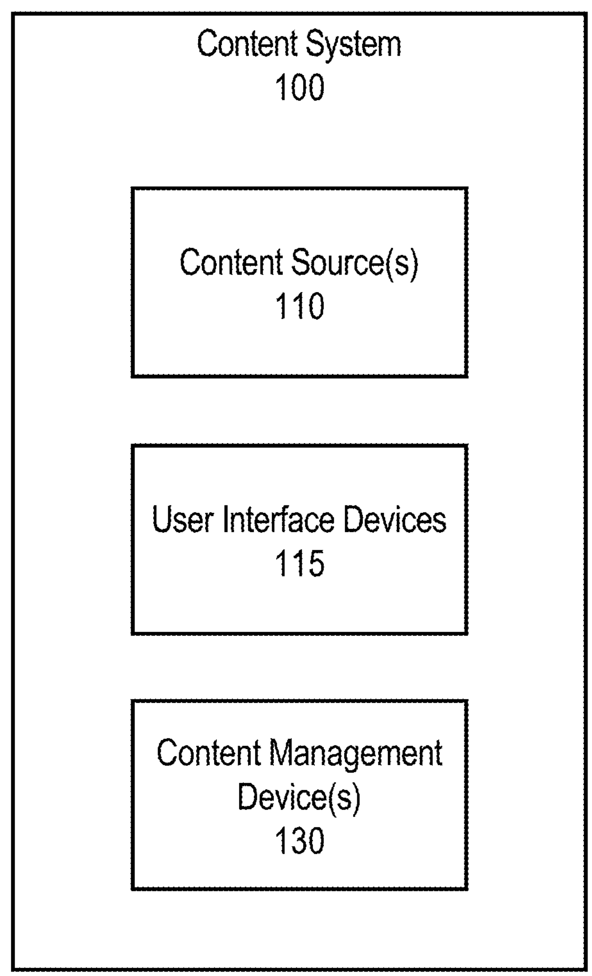
FIG. 2A is a block diagram illustrating an example system in accordance with one or more embodiments.
Figure 2B:
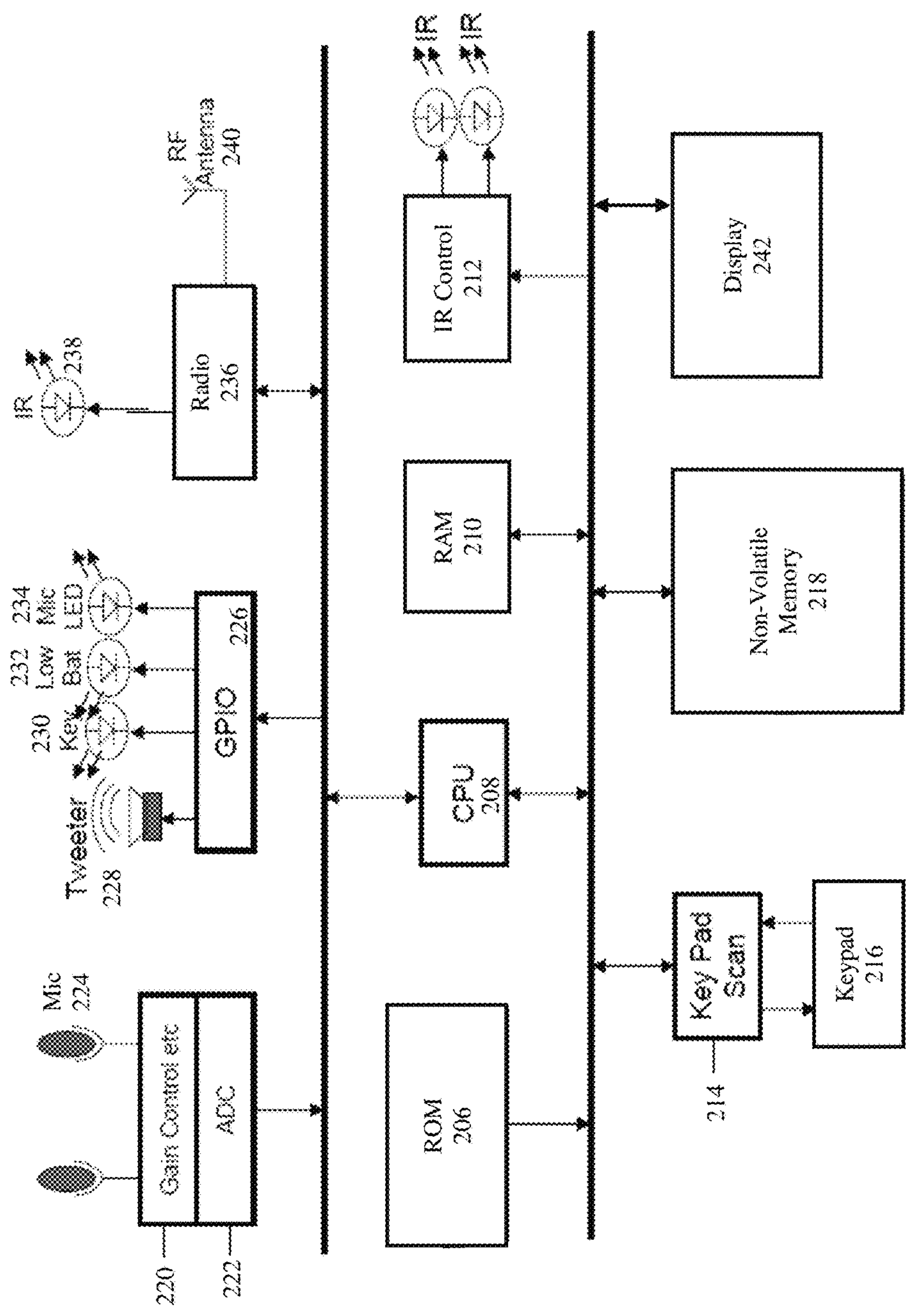
FIG. 2B is a block diagram illustrating an example user interface device in accordance with one or more embodiments.

As shown in FIG. 2B, the remote control device (130) may be communicatively coupled to one or more media devices through wired and/or wireless segments, in accordance with one or more embodiments. The remote control device (130) may communicate wirelessly over one or more of: radio waves (e.g., wi-fi signal, Bluetooth signal), infrared waves, over any other suitable frequency in the electromagnetic spectrum, over a network connection (e.g., intranet, internet, etc.), or through any other suitable method.

In an embodiment, the remote control device (200) may include Read Only Memory (ROM) (206), a Central Processing Unit (CPU) (208), Random Access Memory (RAM) (210), Infrared Control Unit (212), a key pad scan (214), a key pad (216), Non-Volatile Memory (NVM) (218), one or more microphones (224), gain control logic (220), analog to digital convertor (ADC) (222), a general purpose input/output (GPIO) interface (226), a speaker/tweeter (228), a key transmitter/indicator (230), a low battery indicator (or output signal) (232), a microphone LED (234), a radio (236), an Infrared (IR) blaster (238), a Radio Frequency (RF) Antenna (240), a QWERTY sliding keyboard (not shown), ambient noise cancellation device (not shown), etc. Memory on the remote control device (200) (e.g., ROM (206), RAM (210), or NVM (218)) may include control codes and/or key codes for one or more media devices (e.g., media device A (100) or media device B (120)). The memory may include a Run-Length-Limited (RLL) waveform table.

In an embodiment, the low battery indicator (232) may correspond to a visual indication (e.g., LED light) on the remote control device (200) for a low battery level. In an embodiment, the low battery indicator (232) may represent a signal output for display on a screen other than on the remote control device (200). In an embodiment, the low battery code is sent with a standard command. For example, when a channel selection is made on the remote control device (200), the command for the channel selection device is piggy backed with a low battery signal for display on a display screen.

In an embodiment, a microphone (224) may be located anywhere on the remote control device (200) (e.g., one or more microphones (224) may be located at the ends of a remote control device (200)). If multiple microphones are available and turned on, the multiple microphones may be used to obtain user input. In an embodiment, one of the multiple microphones may be used for noise cancellation/optimization manipulations. A single audio stream may be determined from multiple input audio streams by the remote control device (200) or by a media device which receives the multiple audio streams from the remote control device (200).

In an embodiment, the remote control device (200) may include a proximity sensor (not shown) to detect presence of a user within a specified distance of the remote control device (200) even before the user presses a button on the remote control device (200). For example, the remote control device (200) may operate in a low power state until a user is detected. Once a user is detected, the remote control device (200) may operate in a normal power state or a high power state. The remote control device (200) may be configured to turn on keypad lights as soon as a user is detected. In an embodiment, the proximity sensor may be based on capacitive coupling to detect a user near the remote control device (200).

In an embodiment, the remote control device (200) includes one or more displays (242). The displays may be touch screen displays that include functionality to receive user input by a user touching the display screen. The display (242) may be used as a secondary display of a secondary interface device (e.g., the remote control device (200)). Content on display (242) may be related to content displayed another display device (e.g., on a primary user interface). Content on the display (242) and content on the primary user interface may both be transmitted from a single media device or media management device.

5.0 Command Execution—Example Implementation

The following example, describes one possible method of communication between a user interface device and other devices within the system. The set of devices and the steps performed by the set of devices should not be construed as limiting in scope as other variations of the set of devices and the steps performed may be implemented with other embodiments.

A command is received from a user interface device for operating a target media device. The user interface device requests information associated with the command from a second media device. The user interface device may request information about the command itself. For example, the user interface device may request the actual signal, from the second media device, corresponding to the command for transmission to the target media device. The user interface device may request a portion of the actual signal from the second media device. For example, the user interface device may request only a device code for the target media device or other identification of the target media device to use in a signal (e.g., an infrared signal) to send to the target media device.

The user interface device may request state information about the system maintained by the second media device. For example, the second media device may function as a management device and maintain current state information about the system. Examples of state information include the current display information such as interfaces displayed, selections displayed to a user, media content being played, media device providing input to the current display, channel selected, etc. State information may include current configuration settings such as volume, brightness, tint, color, user preferences, etc. State information may include media device information such recordings stored on media devices, recording schedules, viewing/recording history, etc.

The second media device may transmit information associated with the command to the user interface device. The second media device may transmit any of the information requested by the user interface device, as described above. For example, the second media device may transmit a code of the target media device or the actual signal for the user interface device to transmit to the target media device. The second media device may transmit any of the information, described above, without receiving a specific request for the information. For example, the second media device may periodically update the user interface device with state information. The second media device may provide the information to the user interface device in response to detecting a low usage level of the user interface device or the second media device. For example, a number of processor operations over a period of time may be monitored to determine a usage level and thereafter once a threshold level indicative of low usage is detected, the second media device may transmit state information updates to the user interface device.

The user interface device may determine the signal to be sent to the target media device based on the command received from the user and/or the information received from the second media device. Determining the signal may be as simple as receiving all the information including the signal from the second media device. Determining the signal may include determining an operation code based on the command received by accessing a locally stored table which maps commands received to operation codes. Determining the signal may include combining the operation code with information identifying the target media device received from the second media device. Based on the current display and the command received (e.g., an up button or a select button), the user interface device may determine the signal to be transmitted to the target media device.

Another example may involve a user interface device communicating directly with a target media device without interaction with other devices. Yet another example may involve a user interface device communication information associated with a command to a second media device which then communicates with the target media device to perform a function based on the command.

6.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
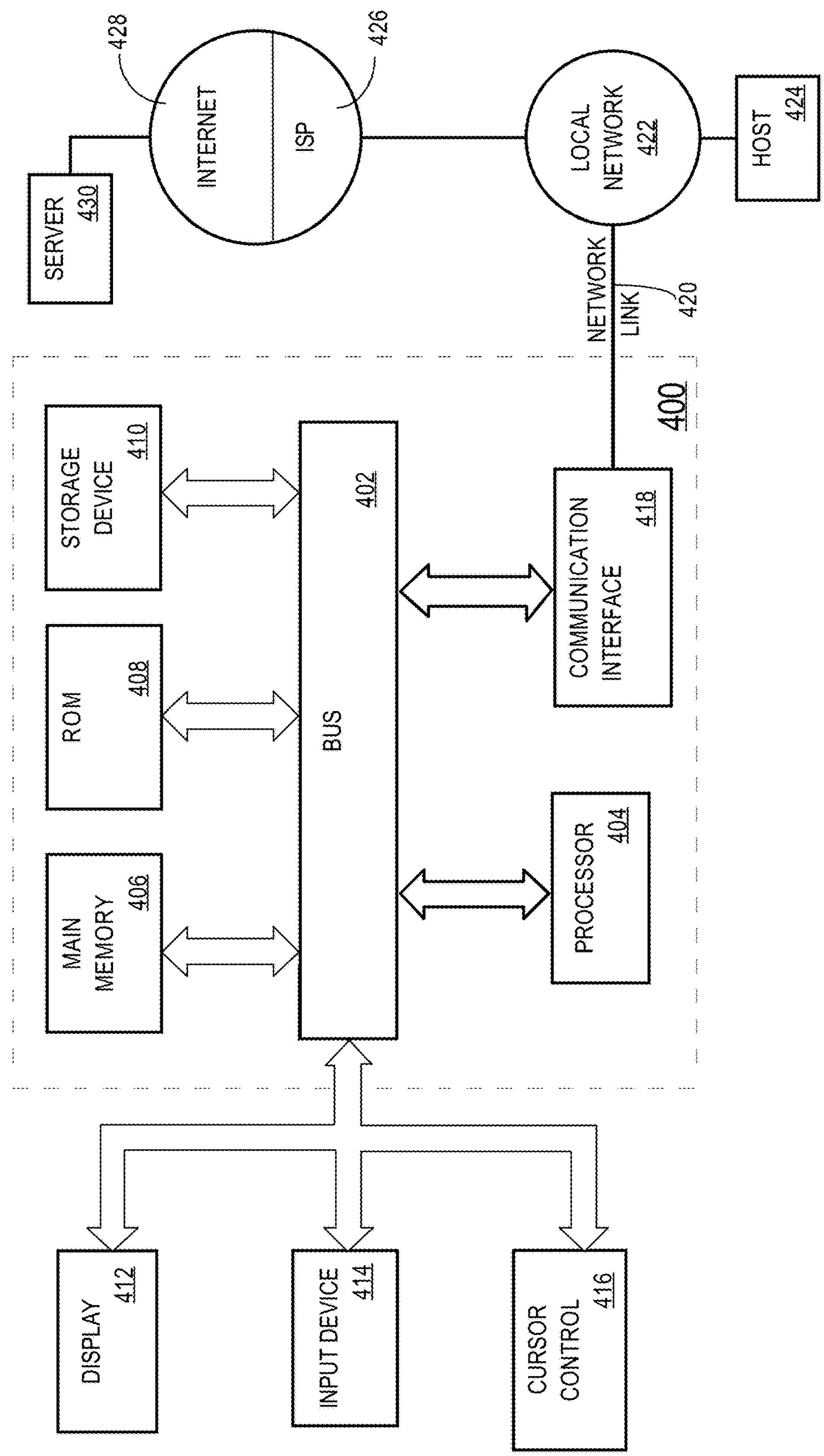
FIG. 4 shows a block diagram that illustrates a system upon which an embodiment of the invention may be implemented.

For example, FIG. 4 is a block diagram that illustrates a System 400 upon which an embodiment of the invention may be implemented. System 400 includes a bus 402 or other communication mechanism for communicating information, and a hardware processor 404 coupled with bus 402 for processing information. Hardware processor 404 may be, for example, a general purpose microprocessor.

System 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render System 400 into a special-purpose machine that is customized to perform the operations specified in the instructions.

System 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

System 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 441, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

System 400 may implement the techniques described herein using customized hard-wired logic, one or more ASICs or FPGAs, firmware and/or program logic which in combination with the System causes or programs System 400 to be a special-purpose machine. According to one embodiment, the techniques herein are performed by System 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to System 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

System 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 424. ISP 424 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from System 400, are example forms of transmission media.

System 400 can send messages and receive data, including program code, through the network(s), network link 420 and communication interface 418. In the Internet example, a server 430 might transmit a requested code for an application program through Internet 428, ISP 424, local network 422 and communication interface 418.

The received code may be executed by processor 404 as it is received, and/or stored in storage device 410, or other non-volatile storage for later execution.

7.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. One or more non-transitory computer-readable media, storing instructions that, when executed by one or more computing devices, cause performance of:

playing back a media content item at a first device;

concurrently playing back the media content item at a second device, the playback of the media content item at the first device synchronized, for a period of time, with playback of the media content item at the second device;

determining a content rating of the media content item; and in response to determining that the content rating of the media content item exceeds a rating threshold:

while the first device is playing back a particular portion of the media content item, playing back different content on the second device in place of the particular portion; and upon completion of playback of the particular portion at the first device, resuming synchronized playback of the media content item at the first device and the second device.

2. The one or more non-transitory computer-readable media of claim 1, wherein the first device is a computing device configured to display the media content item on a television screen, and the second device is a handheld device communicatively coupled to the computing device.

3. The one or more non-transitory computer-readable media of claim 1, wherein the instructions, when executed by the one or more computing devices, further cause:

sending, to the first device and the second device, from a content management device, media streams comprising the media content item, the first device and the second device playing the media content item from the media streams;

sending the different content to the second device in place of the particular portion.

4. The one or more non-transitory computer-readable media of claim 1, wherein the different content is a censored version of the particular portion or an uncensored version of the particular portion.

5. The one or more non-transitory computer-readable media of claim 1, wherein the instructions, when executed by the one or more computing devices, further cause:

the first device sending, to the second device, a media stream comprising the media content item, the second device playing the media content item from the media stream;

censoring the particular portion for playback at the first device;

wherein playing different content comprises the first device sending an uncensored version of the particular portion in place of the particular portion.

6. The one or more non-transitory computer-readable media of claim 1, wherein the instructions, when executed by the one or more computing devices, further cause:

the first device sending, to the second device, a media stream comprising the media content item, the second device playing the media content item from the media stream;

the first device generating a censored version of the particular portion;

wherein playing different content than the particular portion comprises the first device sending the censored version in place of the particular portion.

7. The one or more non-transitory computer-readable media of claim 1, wherein the content management device is the first device.

8. A method comprising:

causing, by a content management device, playback of a media content item at first device;

causing, by the content management device, concurrent playback of the media content item at a second device, the playback of the media content item at the first device synchronized, for a period of time, with playback of the media content item at the second device;

determining a content rating of the media content item; and in response to determining that the content rating of the media content item exceeds a rating threshold:

while the first device is playing back a particular portion of the media content item, the content management device causing playback of different content on the second device in place of the particular portion; and upon completion of playback of the particular portion at the first device, causing resumption of synchronized playback of the media content item at the first device and the second device.

9. The method of claim 8, wherein the first device is a computing device configured to display the media content item on a television screen, and the second device is a handheld device communicatively coupled to the computing device.

10. The method of claim 8, further comprising:

sending, to the first device and the second device, from the content management device, media streams comprising the media content item, the first device and the second device playing the media content item from the media streams;

wherein causing the second device to play different content than the particular portion comprises sending the different content to the second device in place of the particular portion.

11. The method of claim 8, wherein the different content is a censored version of the particular portion or an uncensored version of the particular portion.

12. The method of claim 8, further comprising:

causing the first device to send, to the second device, a media stream comprising the media content item, the second device playing the media content item from the media stream;

causing the first device to censor the particular portion for playback at the first device;

wherein causing the second device to play different content than the particular portion comprises causing the first device to send an uncensored version of the particular portion in place of the particular portion.

13. The method of claim 8, further comprising:

causing the first device to send, to the second device, a media stream comprising the media content item, the second device playing the media content item from the media stream;

causing the first device to generate a censored version of the particular portion;

wherein causing the second device to play different content than the particular portion comprises causing the first device to send the censored version in place of the particular portion.

14. The method of claim 8, wherein the content management device is the first device.

15. A system comprising:

a subsystem, implemented at least partially by hardware in one or more computing devices, configured to cause playback of a media content item at a first device;

a subsystem, implemented at least partially by hardware in one or more computing devices, configured to cause concurrent playback of the media content item at a second device, the playback of the media content item at the first device synchronized, for a period of time, with playback of the media content item at the second device;

a subsystem, implemented at least partially by hardware in one or more computing devices, configured to determine a content rating of the media content item; and subsystems, implemented at least partially by hardware in one or more computing devices, configured, in response to determining that the content rating of the media content item exceeds a rating threshold, to:

while the first device is playing back a particular portion of the media content item, cause playback of different content on the second device in place of the particular portion; and upon completion of playback of the particular portion at the first device, cause resumption of synchronized playback of the media content item at the first device and the second device.

16. The system of claim 15, wherein the first device is a computing device configured to display the media content item on a television screen, and the second device is a handheld device communicatively coupled to the computing device.

17. The system of claim 15, further comprising:

a subsystem configured to send, to the first device and the second device, media streams comprising the media content item, the first device and the second device playing the media content item from the media streams;

wherein causing the second device to play different content than the particular portion comprises sending the different content to the second device in place of the particular portion.

18. The system of claim 15, wherein the different content is a censored version of the particular portion or an uncensored version of the particular portion.

19. The system of claim 15, further comprising:

a subsystem configured to cause the first device to send, to the second device, a media stream comprising the media content item, the second device playing the media content item from the media stream;

a subsystem configured to cause the first device to censor the particular portion for playback at the first device;

wherein causing the second device to play different content than the particular portion comprises causing the first device to send an uncensored version of the particular portion in place of the particular portion.

20. The system of claim 15, further comprising:

a subsystem configured to cause the first device to send, to the second device, a media stream comprising the media content item, the second device playing the media content item from the media stream;

a subsystem configured to cause the first device to generate a censored version of the particular portion;

wherein causing the second device to play different content than the particular portion comprises causing the first device to send the censored version in place of the particular portion.

* * * * *